June 8, 1937.  A. H. HABERSTUMP  2,082,830
VEHICLE BODY
Filed Dec. 4, 1933  2 Sheets-Sheet 1
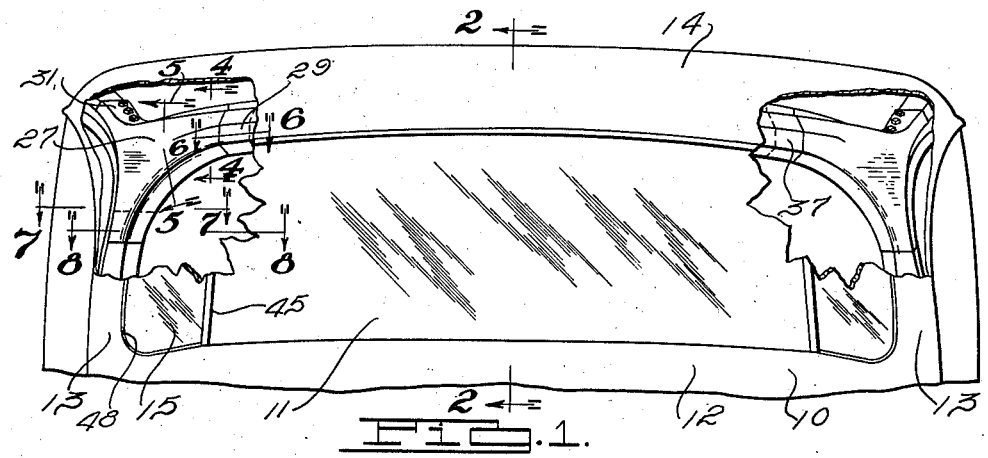
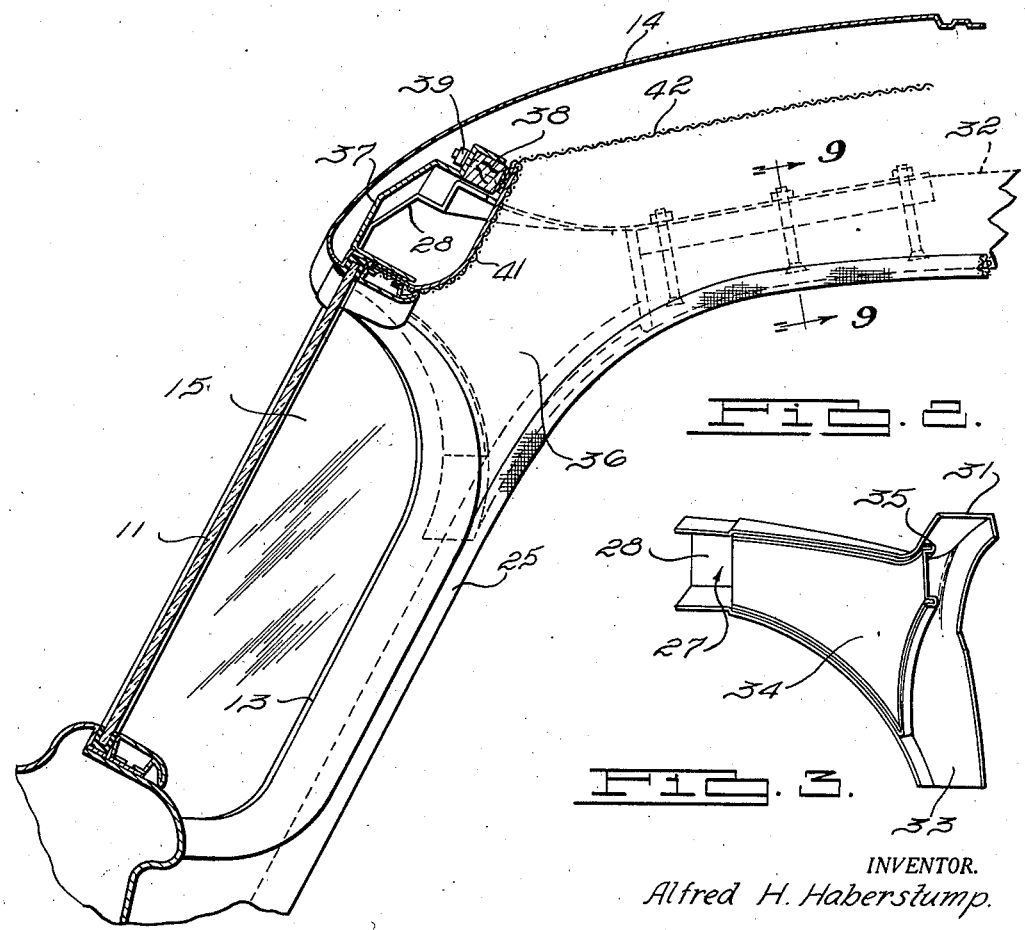
INVENTOR.
Alfred H. Haberstump.
BY
Harness, Dickey, Pierce & Henn.
ATTORNEYS.

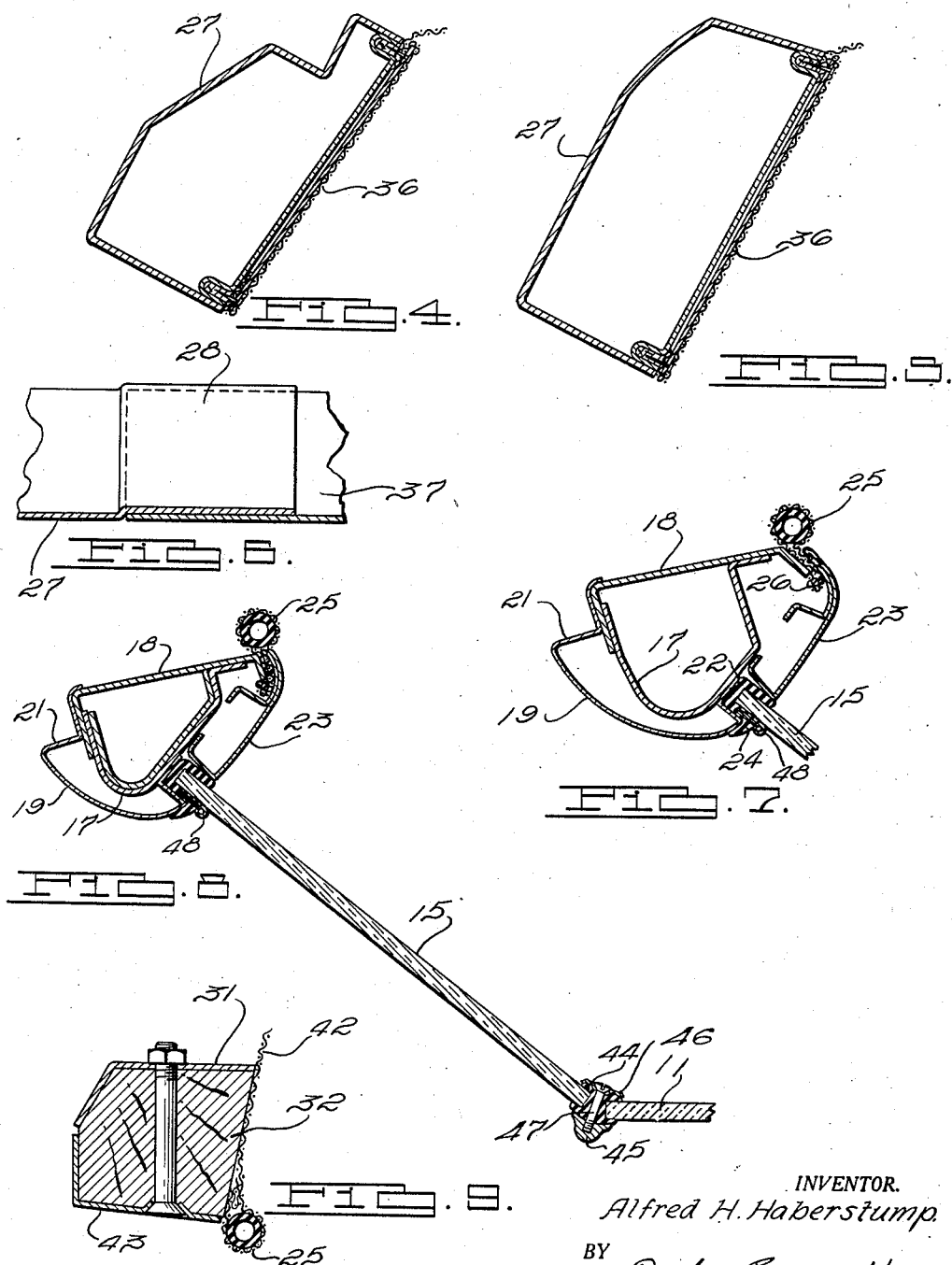

Patented June 8, 1937

2,082,830

UNITED STATES PATENT OFFICE 2,082,830

VEHICLE BODY

Alfred H. Haberstump, Detroit, Mich., assignor to The Murray Corporation of America, a corporation of Delaware Application December 4, 1933, Serial No. 700,793

14 Claims. (Cl. 296—28)

My invention relates to vehicle bodies and particularly to the header and front pillar construction therefor which effects the streamlining of the front top portion of the vehicle body.

The trend in the automotive vehicle body art is turning more and more toward the streamlining of the body to cut down the wind resistance and increase the speed of the vehicle without the necessity of materially increasing the engine horse power. The present construction permits the material sloping of the windshield glass toward the rear and the sides of the vehicle to eliminate as much as possible the square front section which offered material resistance to the wind and the speed of the automobile.

In practicing my invention, I provide pillar reinforcing elements upon which triangularly shaped corner elements are secured and are rounded therefrom to connect with the top cross header and the top side rails of the vehicle body. In this manner a frame is formed upon which the paneling may be disposed which retains the strength required in the body and at the same time permits the body to be shaped to have streamlined features. Heretofore the cross header, pillar and top rail were joined at the point of meeting but since the body is to be curved in varied directions the elements will not meet at a common point. If curved to provide such a meeting point, it is not believed that strength could be provided between the elements as produced by the unit corner elements having the three branches which join the pillar, the header and rail together.

Accordingly, the main objects of my invention are to provide rounded elements for joining the header, the pillar and the top rails to the vehicle body to form a unit structure; to provide a frame for a vehicle body wherein the corner portions are rounded and provided with branches for connecting the various elements of the frame; to provide a header for a vehicle body which is joined at each end to a corner portion having rearwardly extending and downwardly extending branches for joining respectively with the top rails and the pillars of the body; to provide paneling for encompassing the framing of the body which curves toward the top and the sides of the vehicle; to provide a windshield which slopes rearwardly and extends only partially across the vehicle and joined with two side windshield portions which follows the sidewardly sloping contour of the vehicle body; and, in general, to provide elements for constructing the front top portion of a vehicle body which streamlines the body, provides additional visibility thereto and which enhances the appearance of the vehicle.

Other objects and features of novelty of my invention will be either specifically pointed out or will become apparent when referring, for a better understanding of my invention, to the following description taken in conjunction with the accompanying drawings, wherein:

Figure 1 is a broken view of a front top portion of a vehicle body embodying features of my invention, Fig. 2 is an enlarged sectional view of the structure illustrated in Fig. 1, taken on the line 2—2 thereof, Fig. 3 is a perspective view of a corner element employed in the structure illustrated in Figs. 1 and 2, Fig. 4 is an enlarged sectional view of the structure illustrated in Fig. 1, taken on the line 4—4 thereof, Fig. 5 is an enlarged sectional view of the structure illustrated in Fig. 1, taken on the line 5—5 thereof, Fig. 6 is an enlarged sectional view of the structure illustrated in Fig. 1, taken on the line 6—6 thereof, Fig. 7 is an enlarged sectional view of the structure illustrated in Fig. 1, taken on the line 7—7 thereof, Fig. 8 is an enlarged sectional view of the structure illustrated in Fig. 1, taken on the line 8—8 thereof, and Fig. 9 is an enlarged sectional view of the structure illustrated in Fig. 2, taken on the line 9—9 thereof.

Referring to Fig. 1, I have illustrated a vehicle body 10 having a windshield 11 therein, the marginal edges of which are defined by a cowl panel 12, side pillar panels 13 and a top panel 14. In Fig. 2 it will be noted that the side pillar panels 13 slope rearwardly a material amount and that the wind-shield is divided having two side portions 15 which also slope toward the sides of the vehicle body.

The body is constructed by providing pillar reinforcing elements, illustrated more particularly in Figs. 7 and 8, comprising a channel-shaped element 17 which forms a box section with a door jamb portion 18, the outer portion of which is covered by a pillar finish element 19. The rabbet 21 is provided in the panel 19 for the door while a rabbet 22 is provided in the opposite edge to receive the windshield side portions 15 which are removably retained therein by an inner finish molding 23.

A rubber cushioning and sealing strip 24 is provided in the rabbet 22 to encompass the edge of the glass and retain it sealed therein against shock and the entrance of moisture. A suitable door sealing element 25 is disposed adjacent to the inner edge of the door jamb 18, the element being retained in position through the clamping engagement of the molding 23 and the bead on the door portion 18, which retains a bead 26 on the inner end of the sealing strip against outward movement.

The pillars extend slightly above the mid-horizontal plane of the windshield 11 where they are joined by the corner elements 27 illustrated more particularly in Fig. 3. A corner element 27 is stamped and preformed from a sheet of metal to be provided with a projecting arm portion 28 which engages the header portion 29 of the body, with an oppositely disposed end portion 31 which engages a top rail 32 and with a downwardly extending portion 33 which engages the upper edge of the pillar element 17. A box section is formed in the corner portion by an inner plate 34 the marginal edges of which are U-shaped at 35 to provide a small channel for receiving paper, wood or similar material in which tacks may be driven for holding the finish trim of the vehicle relative to the corner plate 34. In this manner, finish trim 36, as illustrated in Fig. 2, is secured on the corners of the header construction for providing a finish thereto.

A header 37 of channel shape, as illustrated more clearly in Figs. 2, 4, and 5, extends across the front part of the body and is joined at each end to the projecting ends 28 of the corner elements 27. A lap joint is effected, as illustrated more clearly in Fig. 6, the element 28 being shouldered to receive the ends of the header 37. A cross bow 38 is secured, preferably by bolts 39, to a rabbet in the header 37 to add strength to the ends thereof and provide a means by which the finish material 41 and 42 is secured to finish the interior of the vehicle. The edges of the material 41 may abut or lap the material 36 which has been tacked to the corner element 27 or a single piece of material may be employed to extend entirely across the header and the corner elements.

In Fig. 9, I have illustrated a side rail 32 which is secured to the top extension 31 of the corner element 27, preferably by bolts, and it is to be understood that the extension 31 may be so formed as to mate with and be joined to metal rail preferably the rails illustrated and described in the copending application of Otto F. Graebner, filed July 22, 1932, Serial No. 624,031, now Patent No. 1,998,895, dated April 23, 1935, and assigned to the assignee of the present invention. The extension 43 of the door rabbet 18 is bolted to the bottom of the rail 32 which retains the extending flange 31 in fixed relation to the rail. It is to be understood that the jamb portion 43 and the flange 31 would mate with and be secured to the side rail by welding or other suitable means if the rail is made of metal. The top finish strip 42 may be tacked directly to the wood rail 32 or when a metal rail is employed other suitable tacking means may be provided.

It will be noted that in this construction the top panel 14 extends outwardly from the side pillars 13 as illustrated more clearly in Fig. 3 to provide a sidewardly directed streamline effect to the front of the body to break up the broad lateral expansion of the windshield which is sloped to direct the air upwardly over the top of the body. In this manner a greater streamline effect is provided which directs the air not only over the top but sidewardly of the body.

The main central windshield portion 11 extends laterally across the front of the vehicle having the two side panel portions 15 sloping rearwardly therefrom. The edges of the glass are retained in the rubber sealing and finish strip 24 while the vertical junction at the lateral edges of the central windshield portion 11 is joined by a resilient element 44 which may have an outer finish element 45 of metal thereover which preferably has a high polish. A metal element 46 is retained against the inner face of the resilient element 44, the two elements 45 and 46 being retained in place by screws 47. A metal bead 48 may cover the rubber element 24 to provide with the elements 45 and 46 a metal finish at the outer edges of all of the glass elements.

The rubber element 24 and strips 44 are preferably constructed as a unit, that is to say, an element 24 having the outline of the front opening as illustrated in Figs. 7 and 8, and having extending medially of the sides the two elements 44 for forming a unit construction. In this manner the windshield portions 11 and 15 are secured together in fixed relation with a cushioning element between all of the edges to resist shock and to seal the edges against the entrance of water.

While I have illustrated and described but a single embodiment of my invention, it will be apparent to those skilled in the art that various changes, omissions, additions and substitutions may be made therein without departing from the spirit and scope of my invention, as set forth in the accompanying claims.

I claim as my invention:

1. A vehicle body having upwardly extending, rearwardly sloping windshield pillars, corner portions mounted on said pillars having laterally and rearwardly projecting end portions, a header joining said laterally extending portions in such manner as to have the header disposed frontwardly of the windshield pillars, and top rails joining with said rearwardly extending end portions.

2. A vehicle body having upwardly extending, rearwardly sloping windshield pillars, corner portions mounted on said pillars having laterally and rearwardly projecting end portions, a header joining said laterally extending portions in such manner as to have the header disposed frontwardly of the windshield pillars, top rails joining with said rearwardly extending end portions, and an inner element spanning said corner portions forming a box section structure therewith.

3. A vehicle body having upwardly extending windshield pillars, corner portions mounted on said pillars having laterally and rearwardly projecting end portions, a header joining said laterally extending portions in such manner as to have the header disposed frontwardly of the windshield pillars, top rails joining said rearwardly extending end portions and an inner element spanning said corner portions forming a box section structure therewith, said reinforcing portions having reversely bent end portions forming channels in which tacking elements may be disposed.

4. A support for the roof of a vehicle body of triangular arcuate shape, one corner being preformed to be secured to the windshield pillar of the body, another corner extending forwardly and laterally thereof, and a second element secured to said support forming a box section structure therewith.

5. A support for the roof of a vehicle body of triangular arcuate shape, one corner being preformed to be secured to the pillars of the body, another corner extending forwardly and laterally thereof, a second element secured to said support forming a box section structure therewith, said element being provided with a recess portion substantially throughout its marginal edge forming a channel in which a tacking element may be disposed.

6. A vehicle body having upwardly extending, rearwardly sloping windshield pillars, arcuate shaped corner elements mounted on the ends of said pillars and laterally extending to form part of the header on the vehicle body which projects frontwardly of the windshield pillars to form an opening, side rails joined to said corner elements and a laterally extending and two sidewardly sloping windshield elements disposed in said opening.

7. A vehicle body having upwardly extending, rearwardly sloping windshield pillars, arcuate shaped corner elements secured to the top edges of said pillars and projecting frontwardly and laterally thereacross forming part of a header which extends frontwardly of the pillars to form an opening which is arcuate in shape laterally of the vehicle, at least three windshield elements disposed in said opening for directing the air upwardly and sidewardly of the vehicle body, and a unit rubber sealing element joining all of the edges of said windshield elements to protect them against shock and the entrance of moisture within the vehicle.

8. A frame for a vehicle body having side rails, a header, and front pillar elements, and corner elements of Y shape arcuately disposed and joined to the edges of the pillar elements, rails and header to form a streamline corner portion for the panel disposed thereover.

9. A frame for a vehicle body having side rails, a header, and front pillar elements, and corner elements of Y shape and arcuately disposed to join the edges of the pillar elements, rails and header to form a streamline corner portion, and paneling extending over said frame elements which slope toward the corner portions.

10. A support for the roof of a vehicle body of triarcuate Y shape, one branch being preformed to be secured to the pillar of the body, another branch extending forwardly and laterally thereof, a second element secured to said support forming a box section structure therewith, said second portion having reversely bent edges forming channels in which tacking elements may be disposed.

11. A vehicle body having upwardly extending, rearwardly sloping windshield pillars, corner elements mounted on said pillars projecting laterally and frontwardly thereacross to form part of a header which extends frontwardly of the windshield pillars providing an uninterrupted opening across the front and at the sides of the body, a windshield element disposed in the front portion of said opening, windshield portions sloping rearwardly and sidewardly of the windshield element, and a unit sealing means engaging the edges of said element and portions.

12. A vehicle body construction including paneling surrounding and defining a windshield opening and forming reveal portions of pillars at the sides thereof, arcuately curved reinforcing elements interiorly of said pillars, a curved windshield header element secured interiorly of said paneling and extending across the top of said windshield opening, said windshield header element being secured to said pillar reinforcing elements to provide therewith a transversely extending reinforced arch across the front of the vehicle body.

13. A vehicle body construction including, in combination, paneling surrounding and defining a windshield opening and forming the reveal portions of pillars at the sides thereof, reinforcing elements secured interiorly of said pillars, said reinforcing elements being curved longitudinally and transversely, longitudinally curved roof rails secured to said reinforcing elements in smoothly curved rearward continuation of said pillars, a windshield header extending transversely of said body secured to said reinforcing elements in transversely curved extension of said pillars, said elements together providing longitudinal reinforced arches at the sides of the vehicle body, and a transversely extending reinforced arch at the front of said body.

14. In a vehicle body construction paneling surrounding and defining a windshield opening and forming reveal portions of pillars at the sides thereof, reinforcing elements secured interiorly of said pillars, a transversely curved windshield header secured interiorly of said paneling and connected at its ends to said reinforcing elements, said windshield header element extending substantially forwardly from said pillars, and forming a transversely extending reinforced arch above said windshield opening.

ALFRED H. HABERSTUMP.